United States Patent Office 3,337,484
Patented Aug. 22, 1967

3,337,484
POLYMERIZABLE COMPOSITIONS COMPRISING VICINAL ACRYLOXY GLYCERIDE, ACID ACRYLIC COMPOUND AND FILLER
David S. Cobbledick and Raymond R. Reschetz, Decatur, Ill., assignors to A. E. Staley Manufacturing Company, Decatur, Ill., a corporation of Delaware
No Drawing. Original application Mar. 12, 1962, Ser. No. 178,982, now Patent No. 3,251,603, dated May 17, 1966. Divided and this application Jan. 25, 1965, Ser. No. 444,882
4 Claims. (Cl. 260—23.5)

This invention relates to a new polymeric caulking material for pipe joints which comprises the in situ polymerization product of acryloxy-substituted fatty-acid esters wherein at least 30 mole percent of said acryloxy-substituted fatty-acid esters contain at least 2 acryloxy substituents per molecule, and the balance may have less than 2 such substituents per molecule.

This application is division of copending application Ser. No. 178,982, filed Mar. 12, 1962, now U.S. Patent No. 3,251,603.

The object of this invention is to provide a new class of polymeric caulking materials for pipe joints. More particularly the object of this invention is to provide a root-proof and leak-proof caulked pipe joint material for connecting pipes made of clay, cement, asbestos cement, cast iron, stoneware, vitrified tile, chemical porcelain ware, drain tile and similar materials which cannot be held to close dimensions in manufacturing. These materials which have been called high dimensional-tolerance materials form the main body of the pipe (see U.S. Patent 2,986,411). The joints in such pipe are caulked with a material that can be held to close dimensional tolerances, the material comprising an addition polymer of acryloxy-substituted fatty-acid esters, wherein at least 30 mole percent of the acryloxy-substituted fatty-acid esters in said polymers contain at least 2 acryloxy substituents per molecule.

As pointed out above, the polymeric caulking materials of this invention are polymers of acryloxy-substituted fatty-acid ester monomers wherein at least 30 mole percent of the acryloxy-substituted fatty-acid esters in the polymer contain at least 2 acryloxy substituents per molecule. These monomers are polymerized in situ in the bell of one pipe and on the mating spigot of another pipe before joining the pipes and they form a strongly adherent bond with the pipe surface. These compounds can be thought of as having a long-chain fatty-acid ester backbone, which has little or no tendency to undergo addition polymerization, and highly reactive addition-polymerizable branches. The fatty-acid ester backbone functions as an internal plasticizer of the polymeric material which permits the pipe joint to expand and contract and otherwise shift without breaking the seal. While plasticizers, which are not integral parts of the polymeric material can perform this function to some extent, they tend to be exuded from the polymeric composition with the passage of time under the severe conditions to which the pipe joints are subjected. This loss of plasticizer tends to shorten the life of the pipe joint by (1) causing the embrittlement of the polymeric material and (2) weakening the bond between the polymeric material and pipe surface. A number of these acryloxy-substituted fatty-acid esters are disclosed and claimed in application Ser. No. 126,394 filed June 8, 1961, now U.S. Patent No. 3,190,899; application Ser. No. 119,339, filed June 26, 1961, now U.S. Patent No. 3,224,989, and application Ser. No. 119,340, filed June 26, 1961, now U.S. Patent No. 3,125,592, which are continuations-in-part of forfeited application Ser. No. 800,071 filed Mar. 18, 1959, application Ser. No. 167,153, filed Jan. 18, 1962, now U.S. Patent No. 3,255,133; and application Ser. No. 167,154, filed Jan. 18, 1962, now U.S. Patent No. 3,304,315.

In somewhat greater detail the acryloxy-substituted fatty-acid esters have the structure:

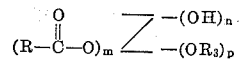

wherein each R is independently an open chain of from 10 to 24 carbon atoms containing at least one segment in said open chain having the structure

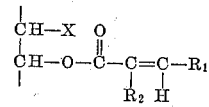

X is hydrogen, halogen or hydroxyl; $R_1$ is hydrogen or $$-\overset{O}{\underset{\|}{C}}-OY$$

when $R_1$ is hydrogen, $R_2$ is hydrogen, alkyl of from 1 to 4 carbon atoms, alkoxy of from 1 to 4 carbon atoms, halogen, phenyl, benzyl or

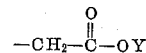

when $R_1$ is

$R_2$ is hydrogen, halogen or alkyl of from 1 to 4 carbon atoms; Y is an aliphatic or aromatic monovalent radical of up to 18 carbon atoms; each $R_3$ is independently an acyl radical of from 1 to 25 carbon atoms or an alkyl radical of from 1 to 18 carbon atoms; Z is the residue of a hydroxyl compound, $m$ is a number of from 1 to 6, $n$ is a number of from 0 to 5, $p$ is a number of from 0 to 5, and the sum of $m$, $n$ and $p$ is 1 to 6, the number of hydroxyl groups in the original hydroxyl compound.

In general, the acryloxy-substituted compounds can be prepared by the techniques disclosed in the aforementioned copending applications, such as (1) reacting polyepoxidized fatty material with an acid acrylic compound which results in X being hydroxyl, (2) reacting a polyepoxidized fatty material with an acid acrylic halide compound which results in X being halogen, (3) reacting a polyethylenically unsaturated fatty material with an alkyl hypohalite and an acid acrylic compound which results in X being halogen and, (4) reacting a polyethylenically unsaturated fatty material, in situ-generated hypochlorous acid and an acid acrylic compound which results in X being halogen. Other techniques can be employed such as reacting an acid acrylic halide compound or an acid acrylic anhydride with a polyhydroxy substituted fatty material, such as castor oil, which results in X being hydrogen.

The following compounds are representative of the various acid acrylic compounds from which the acryloxy groups in the above formula can be derived by the aforementioned techniques:

acrylic acid;
methacrylic acid;
ethacrylic acid;
alpha-chloroacrylic acid;
alpha-bromoacrylic acid;
alpha-iodoacrylic acid;
alpha-phenylacrylic acid;
alpha-benzylacrylic acid;
alphapropoxyacrylic acid;
methyl hydrogen itaconate;
methyl hydrogen maleate;
methyl hydrogen fumarate;
methyl hydrogen mesaconate;

methyl hydrogen citraconate;
ethyl hydrogen maleate;
ethyl hydrogen fumarate;
n-propyl hydrogen maleate;
isopropyl hydrogen fumarate;
n-butyl hydrogen maleate;
tertiary butyl hydrogen fumarate;
isoamyl hydrogen fumarate;
4-methyl-2-pentyl hydrogen fumarate;
n-octyl hydrogen maleate;
2-ethylhexyl hydrogen fumarate;
decyl hydrogen fumarate;
lauryl hydrogen maleate;
n-tridecyl hydrogen maleate;
stearyl hydrogen fumarate;
octyldecyl hydrogen maleate,
phenyl hydrogen maleate;
p-cresyl hydrogen fumarate;
benzyl hydrogen maleate;
naphthyl hydrogen fumarate;
ethyl hydrogen chlorofumarate;
cyclohexyl hydrogen maleate;
p-cresyl hydrogen maleate;
p-chlorophenyl hydrogen maleate;
ethoxyethyl (Cellosolve) hydrogen fumarate;
p-decylphenyl hydrogen maleate;
allyl hydrogen maleate, etc.

The preferred acid acrylic compounds are the halfesters of fumaric acid having from 4 to 13 carbon atoms in the alcohol moiety. These compounds are particularly useful because of their high rate of addition polymerization at room temperature and because of the additional plasticizing effect of the alkoxy group of the half-ester.

The alcohols from which Z in the preceding formula may be derived contain from 1 to 6 hydroxyl groups and from 1 to 24 carbon atoms. They may be open chain compounds such as glycerol and sorbitol or cyclic compounds such as p-dimethylolcyclohexane. Among the suitable monohydric alcohols are methanol, ethanol, octadecanol, etc. Among the suitable dihydric alcohols are ethylene glycol, hexamethylene glycol, and the polyoxyalkylene glycols in which the oxyalkylene groups have 1 to 4 carbon atoms, i.e., the polyoxymethylene glycols, the polyoxyethylene glycols, the polyoxypropylene glycols, etc. Additional suitable higher polyhydric alcohols are pentaerythritol, arabitol, mannitol, trimethylol propane, trimethylol ethane, trimethylol methane, etc.

As can be seen from the above formula, when Z is a polyhydric alcohol it can be partially esterified with a long-chain carboxylic acid, e.g. diglycerides. Also the polyhydric alcohol Z may be esterified in part by an acid such as stearic acid, acetic acid or benzoic acid, which does not contain any polymerizable acryloxy segments. Likewise the polyhydric alcohol may be etherified in part with an alkyl halide such as ethyl chloride, stearyl chloride, etc. which may or may not contain additional substituents.

In general the preferred fatty-acid ester backbones are derived from ethylenically unsaturated naturally occurring glyceride oils and their corresponding epoxidized products, such as soybean oil, corn oil, cottonseed oil, hempseed oil, tung oil, safflower oil, peanut oil, tobacco seed oil, cod oil, herring (or menhaden) oil, castor oil, etc., or from tall oil fatty acid esters of polyhydric alcohols containing 3 or more hydroxyl groups.

While as few as 30 mole percent of the acryloxysubstituted fatty-acid esters can contain at least 2 acryloxy substituents (polyacryloxy-substituted fatty-acid esters) per molecule, we prefer that from about 50 to 100 mole percent of these acryloxy-substituted fatty-acid esters contain at least two acryloxy substituents per molecule in order to form a copolymer having the most advantageous thermoset properties. For convenience the useful polyacryloxy-substituted fatty-acid esters may be viewed as having an average of at least 1.3 acryloxy substituents for the entire content of acryloxy-substituted fatty-acid ester. The various acryloxy-substituted fatty-acid esters may all be based on the same or mixtures of different acid acrylic compounds and/or fatty-acid ester backbones. Other things being equal the compounds prepared by technique (1) polymerize more rapidly than compounds prepared by the various other techniques. This may be due to a higher concentration of acryloxy groups per molecule which it is believed can result from the formation of ether linkages between two or more fatty molecules during the acylation reaction.

The acryloxy-substituted fatty-acid esters comprise from about 40 to 70 weight percent of the polymerizable material (resin forming material) of the caulking material. The remaining 30 to 60 weight percent of the polymerizable material comprises ethylenically unsaturated monomers such as residual acid acrylic compound, which has not reacted with the long chain fatty ester in the aforementioned acylation of the long chain fatty ester, monovinyl aromatics, for example styrene and vinyl toluene; alkyl esters of alpha, beta-ethylenically unsaturated monocarboxylic acids, for example methyl methacrylate, ethyl acrylate, 2-ethylhexyl acrylate, etc. Usually residual acid acrylic compound will comprise from about 1 to 25 weight percent of the polymerizable material and preferably the acid acrylic compound will not be present in excess of about 4 parts per each 13 parts of acryloxy-substituted long chain fatty ester. Generally, it is most economical to employ as much of a monovinyl aromatic having the formula

$b$ being a number from 1 to 2, as possible. However, in some cases plasticizing monomers, such as 2-ethylhexyl acrylate, are necessary in order to give the copolymer the proper flexibility.

The above resin forming composition is then blended with one or more fillers such as silica flour, a barium sulfate, calcium carbonate, starch, clay, chopped glass fibers, etc., which will preferably pass through a 100 mesh screen, in order to lower the cost of the joint material. Silica flour is the preferred filler because of its low cost and fine size. The filler comprises from about 40 to 85% by weight of the joint caulking material and the polymerized resin forming material comprises from about 60 to 15% by weight of the joint caulking material. Best results have been obtained using from about 50 to 75% by weight of a silica flour filler.

Surfactants, such as Tween 20 (polyoxyethylene derivatives of fatty acid partial esters of hexitol anhydrides) and Emulphor EL 620 (polyoxyethylated vegetable oils) have been effective in preventing the various fillers (particularly silica flour of 200 mesh) from settling out of the caulking composition of this invention.

Small amounts of waxes, such as candelilla wax and Concord Nu Karwax, can be added to the caulking composition of this invention in order to give the caulked joint a relatively tack free surface. While the presence of the wax does not effect the performance of the clay pipe joint, the surface of caulked pipe is more aesthetically acceptable to the layman (the pipe fitter).

A typical operation of forming a pipe joint according to our invention comprises first coating the pipe joint with a primer so as to make the polymeric composition of this invention adhere better to the pipe. The primer ensures that the caulked clay pipe can be stored above ground for extended periods of time under severe weather conditions (repeated freezes and thaws) without the polymeric acryloxy-substituted fatty-acid ester losing its adhesion. The primer may be a vinyl trichlorosilane which is condensed on the pipe; or it may be a mixture of flexible and/or rigid hydroxy-terminated polyesters and/or polyether glycols which are reacted on the surface of the pipe with a polyisocyanate such as toluene diisocyanate. When the latter system is employed best results have been obtained using an NCO/OH ratio of from 2.0–2.6:1.

The pipe, with the primer coat applied, is then placed on a suitable flat surface, spigot end down and the spigot end is surrounded by the ring, which has been treated with a mold release agent, such as polyvinyl stearate, petrolatum, carbowax, etc., forming a mold between the pipe and the ring to receive the joint forming material. Correspondingly, a ring is placed in the bell end. In each case, the ring and pipe end are essentially concentric and form an annular mold between said ring and pipe end. The polymerizable caulking composition comprising the acryloxy-substituted fatty acid ester and filler mixed with one or more free radical catalysts, such as dibenzoyl peroxide, methyl ethyl ketone peroxide, hydroxyheptyl peroxide, etc., is then poured into the mold to the proper height to form the joint defined by the mold. External heat may be applied to polymerize the resin forming materials. However, it is generally preferable to add one or more accelerators (or driers) such as cobalt naphthenate, cobalt octoate, dimethyl aniline, etc., to the polymerizable material in order to get a rapid room temperature cure.

When a room temperature cure is desired, it is advantageous to employ a mixing gun which is fed by two tanks. The first tank contains all the components of the polymerizable composition (catalyst, polymerizable monomers, filler, etc.) except the accelerator, which are either mixed together in the tank or in separate compartments, while the second tank contains all the components of the polymerizable composition (including the accelerator) except the catalyst. All the components are mixed in the mixing gun and flowed at a steady rate from the gun into the molds. Usually the polymerizable composition will gel in 2–10 minutes and set to a solid mass which is substantially bonded to the pipe in from about 5 to about 30 minutes. At this point the molds are removed from the pipe.

As pointed out above one of the two rings, usually the ring for the spigot end contains a circular projection around its circumference, which results in a groove being molded in the exterior surface of one caulking ring on the pipe. An O-ring is then fitted into the groove before the spigot or male end of one pipe is joined to the bell or female end of the second pipe. The O-ring ensures that a complete seal has been formed.

The following examples are merely illustrative and should not be construed as limiting the scope of the invention.

*Example I*

A 2-ethylhexyl fumaryloxy-hydroxy soybean oil was prepared as follows. One mole of maleic anhydride (98 grams) was weighed into a flask equipped with a stirrer, thermometer, condenser and dropping funnel and then heated to 110° C. One mole of 2-ethylhexanol (130 grams) was added slowly (approximately 20 minutes) through the dropping funnel while maintaining the reaction mixture at 110° C. The temperature was maintained at 110° C. for forty minutes after the addition of 2-ethylhexanol was complete. The resultant half-ester of maleic acid was isomerized by heating at 110° C. for 12 minutes in the presence of sixty-eight hundredths of a gram of phosphorus trichloride. Immediately thereafter, 250 grams of epoxidized soybean oil containing 6.4% by weight of oxirane (1 equivalent) and 0.23 grams of basic zinc sulfoxalate formaldehyde (0.0013 mole) were added to the half ester reaction vessel. The reactants were maintained at 135° C. until the oxirane value (by HBr-acetic acid titration) was less than 0.10 meq./g. (40 minutes). The product after cooling was a viscous clear, pale yellow liquid having on an average two fumaryloxy-hydroxy groups for each molecule of epoxidized soybean oil reacted. The product analyzed:

Free 2-ethylhexyl hydrogen
  fumarate _____percent by weight__ 20.5
Saponification _____meq./g.___ 5.92
Hydroxyl _____meq./g.___ 1.50
Trans isomer _____percent__ 98
Viscosity at 25° C. _____cp__ 28,500

The bell end and spigot end of an 8-inch diameter clay pipe were coated with a thin layer of a primer. This primer was prepared by mixing 10 parts of Mondur TD–80 (a mixture of 80 parts 2,4-toluene diisocyanate and 20 parts 2,6-toluene diisocyanate) with 65 parts of a mixture of 2,492 parts ethyl acetate (urethane grade), 48 parts methyl diethanol amine, 80 parts C.P. Cadmium medium red #300 pigment, 288 parts Multron R–12 (a moderately branched polyester having an acid number of 4.0, hydroxyl number of from 158 to 170 and an equivalent weight of 337) and 432 parts Multron-18 (a polyester having an acid number 1.5, a hydroxyl number of from 47 to 63 and an equivalent weight of 920). After the primer was permitted to dry for about 10 minutes, a ring was placed inside the bell end of the pipe and a second ring was placed around the spigot end of the pipe. The rings had been treated with a mold release agent, comprising 30 parts by weight Kyrax A (a polyvinyl stearate polymer) and 70 parts by weight of Skellysolve C (heptane).

Sixty-seven parts of the 2-ethylhexyl fumaryloxy-hydroxy soybean oil described above (containing 20.5% by weight free 2-ethylhexyl hydrogen fumarate), 22 parts styrene and 11 parts 2-ethylhexyl acrylate were blended with 190 parts of silica flour (Sterling 200 mesh), 0.02 part 1,4 naphthoquinone and 0.05 part Emulphor EL 620. One half part methyl ethyl ketone peroxide and one half part bis (1-hydroxy cyclohexyl) peroxide were added to one half of the aforementioned composition. One part cobalt naphthenate and 0.5 part dimethylaniline was added to the other half of this composition. The two compositions were then mixed together and poured into the bell end of the pipe. The fumaryloxy-hydroxy soybean oil caulking gelled in about 2½ to 3 minutes. Shortly thereafter the ring was pulled from the bell end. The joint now had a smooth, uniform cylindrical surface. A similar composition was prepared and applied to the spigot end of the pipe with essentially the same results. An O-ring was placed in the previously prepared groove and a second 8″ pipe prepared by the same method were joined forming a tight slip-seal.

The bond between the clay pipe of the type described above and the polymeric caulking material was tested in the following manner. The pipe was soaked in water for 4 hours at room temperature, then was placed in a food freezer at 0° F. for 16 hours, and then removed from the food freezer and equilibrated for 4 hours at room temperature. After 30 of these freeze-thaw cycles there was no sign of any deterioration in the bond between the pipe and the caulking composition of this invention. The above freeze-thaw cycling was designed to simulate outdoor storage during the winter.

The above example was repeated with essentially the same results using various sizes of pipe up to and including 24″ diameter pipe.

*Example II*

Example I was repeated with essentially the same results except that the room temperature catalyst and accelerator systems were varied as indicated in the table below.

| Benzoyl Peroxide, 50% by Weight Active | Parts By Weight of Catalytic Component | | | | Gel Time of Composition in Minutes |
|---|---|---|---|---|---|
| | Methyl Ethyl Ketone Peroxide | Bis-(Hydroxy Cyclohexyl) Peroxide | Cobalt Napthenate | Dimethyl Aniline | |
| ------- | 0.5 | 0.5 | 0.5 | 0.25 | 7.5-8.0 |
| ------- | 1.0 | 1.0 | 0.5 | 0.25 | 7.0-7.5 |
| ------- | 0.5 | 0.5 | 0.5 | 0.5 | 5.0-5.5 |
| 1.0 | 1.0 | ------- | 1.5 | 0.5 | 4.5-5.0 |
| 1.0 | 1.0 | ------- | 1.5 | 0.25 | 5.25-5.75 |
| 1.0 | 1.0 | ------- | 1.0 | 0.5 | 5.5-6.0 |
| 1.0 | 1.0 | ------- | 1.0 | 0.25 | 6.5-7.0 |

*Example III*

Example I was repeated with essentially the same results except that 100 parts of silica flour was used instead of 180 parts.

*Example IV*

Example I was repeated except that 0.5 part candelilla wax was added to the caulking composition. The surface of the caulked joints were substantially tack free while the surface of the caulked joints prepared by the method of Example I were somewhat tacky. The same improvement in tack resulted from the substitution of 0.5 part Concord Nu Karwax for the candelilla wax.

*Example V*

An eight inch diameter clay pipe was primed with a composition comprising 5 parts of vinyl trichlorosilane in 95 parts naphtha. The primer was allowed to dry for 15 minutes and then joints were cast by the method of Example I except that 150 parts silica flour was used as the filler. The pipe was subjected to thirty complete freeze-thaw cycles as described in Example I without any sign of deterioration in the bond between the caulking composition and the joint. Essentially the same results were obtained by replacing the naphtha with either Skellysolve C or Skellysolve L.

It was found that when the vinyl trichlorosilane was replaced by silicon tetrachloride, methyl trichlorosilane, ethyl trichlorosilane, phenyl trichlorosilane, dimethyl dichlorosilane or methyl vinyl dichlorosilane, the caulked pipes could not be stored above ground prior to use.

*Example VI*

Example I was repeated with essentially the same results except that the 2-ethylhexyl fumaryloxy-hydroxy soybean oil was replaced by 70 parts of a decyl fumaryloxy-hydroxy soybean oil and the styrene content was increased to 30 parts by omitting the 2-ethylhexyl acrylate. The decyl fumaryloxy-hydroxy soybean oil was prepared by the technique described in Example I except that 0.7 mole of monodecyl fumarate was reacted with 1 equivalent of epoxidized soybean oil.

*Example VII*

Example I was repeated with essentially the same results except that the primer used consisted of 10 parts Mondur TD-80 and 60 parts of a mixture consisting of 432 grams Multron R-18, 288 grams Multron R-12, 80 grams C.P. Cadmium medium red #300 pigment, 72 grams methyl diethanolamine and 2,428 grams ethyl acetate.

*Example VIII*

Example I was repeated with essentially the same results except that the 2-ethylhexyl fumaryloxy-hydroxy soybean oil was replaced by 67 parts methylamyl fumaryloxy hydroxy soybean oil, which was prepared by the same technique described in Example I except that 1 mole of methylamyl alcohol was used in place of 1 mole 2-ethylhexanol.

*Example IX*

Example I was repeated except that the joint caulking composition was based on a methylamyl fumaryloxy-chloro soybean oil. The 4-methyl-2-pentanol (methylamyl alcohol) fumaryloxy-chloro soybean oil was prepared as follows. Maleic anhydride (0.8 mole) was heated to 110° C. in a reaction vessel equipped with a stirrer, a condenser and a reactant addition port. Eight-tenths of a mole of 4-methyl-2-pentanol was added over a 40 minute period while controlling the exothermic reaction at 110–114° C. This reaction temperature was maintained for an additional 20 minutes and then the reaction was cooled to 90° C. The resultant half-ester was isomerized at 90° C. for 25 minutes using 1.0 gram of aluminum trichloride. Two hundred grams of soybean oil and 0.03 gram of p-methoxy phenol were added rapidly to the vessel and the temperature was adjusted to 65° C. One mole of tertiary butyl hypochlorite was added over sixty minutes while maintaining the exothermic reaction at 65–70° C. The reaction temperature was maintained for an additional 30 minutes before vacuum distilling by-product tertiary-butyl alcohol. The product was a clear, pale-yellow liquid having a viscosity of 5,000 cp. at 25° C. and an average of about 2-fumaryloxy groups per molecule.

Three hundred and sixty parts silica flour, 140 parts of the above described methylamyl fumaryloxy-chloro soybean oil product, 60 parts styrene, 0.04 part 1,4 naphthoquinone and 0.10 part Emulphor EL-620 were blended together and then split into two equal parts. One part hydroxyheptyl peroxide and 2 parts methyl ethyl ketone peroxide were blended into one of the fumaryloxy-chloro compositions while 4 parts cobalt naphthenate and 2 parts dimethyl aniline were blended into the other fumaryloxy-chloro composition. The two fumaryloxy-chloro compositions were mixed together and immediately poured into the previously prepared molds. The polymerizable composition had a gel time of about 4.5–5.0 minutes but the rings could not be pulled from the mold as rapidly as in the previous example. The clay pipe was subjected to thirty complete freeze-thaw cycles as described in Example I without any sign of deterioration in the bond between the caulking composition and the joint.

*Example X*

Example IX was repeated with essentially the same results except that an 8 inch clay pipe was primed with the primer used in Example V.

*Example XI*

Example IX was repeated with essentially the same results except that a 2-ethylhexyl fumaryloxy-chloro soybean oil was employed. The 2-ethylhexyl fumaryloxy-chloro soybean oil was prepared by the method described in Example IX except that the 0.8 mole of methylamyl alcohol was replaced by 0.8 mole of 2-ethylhexanol.

*Example XII*

Example IX was repeated except that 1.0 part candelilla wax was added to 140 parts of the methylamyl fumaryloxy-chloro soybean oil, which was then heated to about 190° F. to disperse the wax better, prior to blending of this component with the rest of the caulking composition. Essentially the same results were obtained except that the surface of the polymeric composition was tack free.

Since many embodiments of this invention may be made and since many changes may be made in the em-

We claim:

1. An addition polymerizable composition comprising from 40 to 85 parts by weight of an inorganic filler and from 60 to 15 parts by weight of a resin forming material comprising from about 40 to 70 weight percent of acryloxy-substituted glyceride oil containing a substituent on a carbon atom vicinal to each acryloxy substituent selected from the class consisting of chloro and hydroxy, said acryloxy group being selected from the group consisting of unsubstituted acryloxy, methacryloxy, alkyl fumaryloxy containing from 4 to 13 carbon atoms in said alkyl group and mixtures thereof, and from 30 to 60 weight percent of a monomeric mixture of acid acrylic compound selected from the group consisting of acrylic acid, methacrylic acid, alkyl half-esters of fumaric acid having from 4 to 13 carbon atoms in said alkyl group and mixtures thereof and an alpha beta-ethylenically unsaturated monomer selected from the class consisting of styrene, butyl acrylate, 2-ethylhexyl acrylate and mixtures thereof, said acid acrylic compound comprising from 1 to 25 weight percent of said resin forming material, wherein at least about 30 mole percent of said acryloxy-substituted glyceride oil has at least 2 acryloxy substituents per molecule.

2. An addition polymerizable composition comprising from 40 to 85 parts by weight of an inorganic filler and from 60 to 15 parts by weight of a resin forming material comprising from about 40 to 70 weight percent of alkyl fumaryloxy-hydroxy glyceride oil containing from 4 to 13 carbon atoms in said alkyl group and from 30 to 60 weight percent of a monomeric mixture of an acid acrylic compound selected from the group consisting of acrylic acid, methacrylic acid, alkyl half-esters of fumaric acid having from 4 to 13 carbon atoms in said alkyl group and mixtures thereof and an alpha beta-ethylenically unsaturated monomer selected from a class consisting of styrene, butyl acrylate, 2-ethylhexyl acrylate and mixtures thereof, said acid acrylic acompound comprising from 1 to 25 weight percent of said resin forming material, wherein at least about 50 mole percent of said fumaryloxy-substituted glyceride oil has at least 2 fumaryloxy substituents per molecule.

3. An addition polymerizable composition comprising from 40 to 85 parts by weight of an inorganic filler and from 60 to 15 parts by weight of a resin forming material comprising from about 40 to 70 weight percent of alkyl fumaryloxy-chloro glyceride oil containing from 4 to 13 carbon atoms in said alkyl group and from 30 to 60 weight percent of a monomeric mixture of an acid acrylic compound selected from the group consisting of acrylic acid, methacrylic acid, alkyl half-esters of fumaric acid having from 4 to 13 carbon atoms in said alkyl group and mixtures thereof and an alpha beta-ethylenically unsaturated monomer selected from a class consisting of styrene, butyl acrylate, 2-ethylhexyl acrylate and mixtures thereof, said acid acrylic compound comprising from 1 to 25 weight percent of said resin forming material, wherein at least about 50 mole percent of said fumaryloxy-substituted glyceride oil has at least 2 fumaryloxy substituents per molecule.

4. The composition of claim 1, wherein said filler is silica flour and said silica flour comprises from 50 to 75 weight percent of said composition.

References Cited

UNITED STATES PATENTS

| | | | |
|---|---|---|---|
| 2,141,546 | 12/1938 | Strain | 260—405 |
| 2,809,946 | 10/1957 | Blegen et al. | 260—22 |
| 2,990,388 | 6/1961 | Johnston et al. | 260—23.5 |
| 3,066,112 | 11/1962 | Bowen | 260—23.5 |
| 3,190,899 | 6/1965 | Walton et al. | 260—23 |
| 3,224,989 | 12/1965 | Nevin | 260—23 |
| 3,251,603 | 5/1966 | Cobbledick et al. | 277—198 |
| 3,255,133 | 6/1966 | Nevin | 260—23 |

OTHER REFERENCES

Bjorksten et al., "Polyesters and Their Applications" (1956), pp. 73 and 90–94.

DONALD E. CZAJA, *Primary Examiner.*

LEON J. BERCOVITZ, *Examiner.*

R. A. WHITE, *Assistant Examiner.*